(12) United States Patent
Brondijk

(10) Patent No.: US 8,397,021 B2
(45) Date of Patent: Mar. 12, 2013

(54) FORMATTING MULTI-LAYER STORAGE MEDIA

(75) Inventor: Robert Albertus Brondijk, Eindhoven (NL)

(73) Assignee: Konikklijke Philips Electronics N.V., Eindhoven (NL)

( * ) Notice: Subject to any disclaimer, the term of this patent is extended or adjusted under 35 U.S.C. 154(b) by 786 days.

(21) Appl. No.: 12/096,186

(22) PCT Filed: Dec. 1, 2006

(86) PCT No.: PCT/IB2006/054540

§ 371 (c)(1), (2), (4) Date: Jun. 5, 2008

(87) PCT Pub. No.: WO2007/066261

PCT Pub. Date: Jun. 14, 2007

(65) Prior Publication Data

US 2008/0291790 A1    Nov. 27, 2008

(30) Foreign Application Priority Data

Dec. 6, 2005 (EP) ..................................... 05301011

(51) Int. Cl.
*G06F 12/00* (2006.01)
*G11B 7/0037* (2006.01)
*G11B 7/007* (2006.01)
*G06F 12/02* (2006.01)
*G11B 7/242* (2006.01)

(52) U.S. Cl. ................ 711/112; 711/209; 711/E12.001; 369/94; 369/275.2; 369/275.3

(58) Field of Classification Search ........................ None
See application file for complete search history.

(56) References Cited

U.S. PATENT DOCUMENTS

| | | | |
|---|---|---|---|
| 5,682,547 A * | 10/1997 | Sekiya | 710/1 |
| 6,088,177 A * | 7/2000 | Onoda et al. | 360/48 |
| 6,606,285 B1 * | 8/2003 | Ijtsma et al. | 369/47.1 |

(Continued)

FOREIGN PATENT DOCUMENTS

| | | |
|---|---|---|
| EP | 1517312 A2 | 3/2005 |
| JP | 2005093031 A | 4/2005 |

(Continued)

OTHER PUBLICATIONS

International Search Report of International Application No. PCT/IB2006/054540 Contained in International Publication No. WO2007066261, Aug. 24, 2007.

(Continued)

*Primary Examiner* — Jasmine Song
*Assistant Examiner* — Daniel Bernard

(57) ABSTRACT

A device for recording information on a storage medium (11) is arranged for formatting the storage medium. The device has receives a format command according to a protocol (ATA/ATAPI). The device has formatting means for formatting a multilayer storage medium according to the format command. The formatting includes recording, on each layer (L0, L1) of the multilayer storage medium, a first control zone (71, 72) at a first radial position on the layer and a second control zone (73, 74) at a second radial position on the layer for forming an annular data zone of a selected size between the control zones. If the format size is smaller than a maximum available size on the storage medium, the control zones are positioned on substantially equal radial positions for forming radially corresponding annular data zones (75, 76). The required format size equals the sum of the selected sizes of each annular data zone.

9 Claims, 5 Drawing Sheets

U.S. PATENT DOCUMENTS

| | | | |
|---|---|---|---|
| 6,876,612 B2* | 4/2005 | Yoneyama et al. | 369/47.55 |
| 6,996,666 B2* | 2/2006 | Sasaki | 711/112 |
| 7,110,339 B2* | 9/2006 | Suzuki | 369/59.11 |
| 7,133,339 B2* | 11/2006 | Sasaki | 369/53.17 |
| 7,330,410 B2* | 2/2008 | Ohhashi | 369/53.18 |
| 7,441,076 B2* | 10/2008 | Sasaki | 711/112 |
| 7,586,821 B2* | 9/2009 | Sasaki | 369/53.17 |
| 7,773,484 B2* | 8/2010 | Watanabe et al. | 369/94 |
| 7,797,478 B2* | 9/2010 | Sasaki | 711/102 |
| 2002/0114245 A1* | 8/2002 | Sasaki | 369/53.37 |
| 2002/0159353 A1* | 10/2002 | Sasaki | 369/53.15 |
| 2003/0033475 A1* | 2/2003 | Sasaki | 711/112 |
| 2003/0063545 A1* | 4/2003 | Suzuki | 369/59.25 |
| 2003/0081525 A1* | 5/2003 | Yoneyama et al. | 369/59.25 |
| 2003/0169651 A1 | 9/2003 | Kobayashi | |
| 2003/0174624 A1 | 9/2003 | Kobayashi | |
| 2003/0202443 A1* | 10/2003 | Nakagawa et al. | 369/53.18 |
| 2003/0210627 A1* | 11/2003 | Ijtsma et al. | 369/53.18 |
| 2005/0030852 A1 | 2/2005 | Sasaki | |
| 2005/0030873 A1* | 2/2005 | Sasaki | 369/59.25 |
| 2005/0036427 A1 | 2/2005 | Suh | |
| 2005/0063290 A1 | 3/2005 | Suzuki | |
| 2005/0276195 A1* | 12/2005 | Sasaki | 369/53.15 |
| 2006/0069860 A1* | 3/2006 | Sasaki | 711/112 |
| 2006/0120238 A1* | 6/2006 | Sasaki | 369/47.1 |
| 2006/0198265 A1* | 9/2006 | Sasaki | 369/53.24 |
| 2006/0239168 A1* | 10/2006 | Shoji et al. | 369/94 |
| 2006/0245324 A1* | 11/2006 | Sasaki | 369/59.1 |
| 2007/0083702 A1* | 4/2007 | Sakai | 711/112 |
| 2007/0263988 A1* | 11/2007 | Takeuchi | 386/107 |
| 2008/0059689 A1* | 3/2008 | Sasaki | 711/102 |
| 2008/0080347 A1* | 4/2008 | Nakagawa et al. | 369/53.18 |
| 2008/0152323 A1* | 6/2008 | Hora | 386/126 |
| 2008/0219124 A1* | 9/2008 | Matsuba | 369/94 |
| 2009/0092026 A1* | 4/2009 | Watanabe et al. | 369/100 |
| 2009/0279417 A1* | 11/2009 | Terui | 369/284 |
| 2010/0046337 A1* | 2/2010 | Morishige et al. | 369/47.15 |
| 2011/0242948 A1* | 10/2011 | Suzuki et al. | 369/30.03 |

FOREIGN PATENT DOCUMENTS

| | | |
|---|---|---|
| WO | WO03100774 A1 | 12/2003 |
| WO | WO03105141 A1 | 12/2003 |
| WO | 2004086380 A1 | 10/2004 |
| WO | WO2005020232 A2 | 3/2005 |
| WO | 2007066261 A2 | 6/2007 |

OTHER PUBLICATIONS

Written Opinion of the International Searching Authority for International Application No. PCT/IB2006/054540, Aug. 24, 2007.

National Committee for Information Technology Standards (NCITS) :Working Draft, TIO/1675-D, Revision 1, Oct. 31, 2004, "Information Technology-Multimedia Commands MMC-5".

* cited by examiner

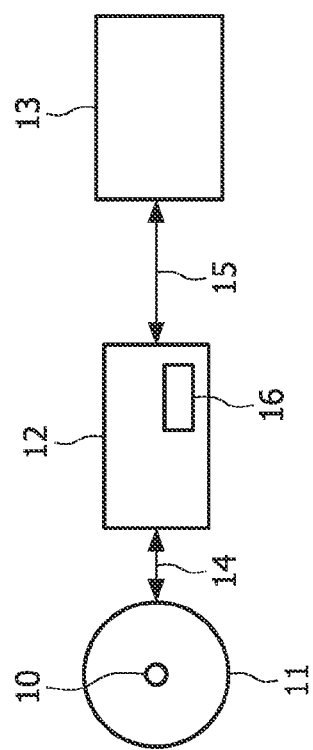

| Byte | Bit 7 | 6 | 5 | 4 | 3 | 2 | 1 | 0 |
|---|---|---|---|---|---|---|---|---|
| 0 - 3 | Format List Header |||||||| 
| 4 - n | Initialization Pattern Descriptor (present if IP = 1) |||||||| 
| n+1 to n+8 | Format Descriptor ||||||||

31 — Format List Header
32 — Format Descriptor

FIG. 3

| Byte | Bit 7 | 6 | 5 | 4 | 3 | 2 | 1 | 0 |
|---|---|---|---|---|---|---|---|---|
| 0 | Reserved |||||||| 
| 1 | FOV | DPRY | DCRT | STPF | IP | Try-out | IMMED | VS |
| 2 | (MSB) Format Descriptor Length |||||||| 
| 3 | (LSB) ||||||||

FORMATTING MULTI-LAYER STORAGE MEDIA

FIELD OF THE INVENTION

The invention relates to a device for recording information on a storage medium, the device comprising for recording information on a storage medium, the device comprising scanning means for scanning the storage medium for recording and retrieving data on a recording layer of the storage medium, interface means for receiving commands according to a protocol, the commands including a format command, and formatting means for formatting the storage medium according to the format command, the format command including a size parameter indicative of a format size.

The invention further relates to a method of formatting a storage medium for recording data and retrieving data, the method comprising receiving commands according to a protocol, the commands including a format command, and formatting the storage medium according to the format command, the format command including a size parameter indicative of a format size.

The invention further relates to a computer program product for formatting the storage medium.

BACKGROUND OF THE INVENTION

Formatting an optical record carrier is known from a draft proposal of the National Committee for Information Technology Standards (NCITS): Working Draft, T10/1675-D, Revision 1, 11 Oct. 2004, "INFORMATION TECHNOLOGY-Multimedia Commands MMC-5" (in this document further called MMC-5). In MMC-5, it is required to format a DVD+RW disc before user data may be written to it. A format command may be given according to the known protocol as defined in MMC-5. According to the format a user data zone is created, preceded by a lead-in control zone. After the data zone following the lead-in control zone, a further control zone, usually called lead-out, may be recorded at the end boundary of the data zone.

According to the format command, the control zones on the respective layers have to be recorded. The MMC-5 defines that, according to chapter 4.4.8.3 regarding the DVD+RW Basic Format, relative to the start of the record carrier, the Data Zone is the user space and should be addressed according to logical block addressing (LBA known from DVD-ROM). The physical to logical address mapping for DVD+RW is the same as that for DVD-ROM: when a physical sector number (PSN known from DVD-ROM) represents a sector in the data zone, its LBA=PSN-030000h. Furthermore MMC-5 describes the formatting, in chapter 6.5 regarding the FORMAT UNIT Command. The FORMAT UNIT command formats a medium into addressable logical blocks according to options defined in the MMC-5 protocol. In chapter 6.5.3.4.12 a specific example of the format, called DVD+RW Basic Format, is explained. In the command a Number of Blocks field shall be set to either the value returned by the Read Format Capacities command or FFFFFFFFh. The available capacity of the medium is detected by the Read Format Capacities command. Due to this setup the storage medium is formatted at its maximum available capacity, applying a predefined mapping of logical to physical addresses.

Currently recordable multilayer record carriers are being developed. On a multilayer record carrier each layer has its own annular data zone, while the annular data zones together may constitute a single logical data storage space. For example on a dual layer record carrier, on the first layer the annular data zone starts with the lead-in zone, and is terminated by a middle control zone. The second layer then starts with a middle control zone, and is terminated by the lead-out control zone.

However, the known way of formatting is inflexible, and does not allow multilayer carriers to be adapted to any intended use. In particular, MMC-5 does not provide any specific way of formatting a multilayer storage medium.

SUMMARY OF THE INVENTION

Therefore it is an object of the invention to provide a formatting system that allows formatting of a multilayer storage medium.

According to a first aspect of the invention the object is achieved with a device for recording information as described in the opening paragraph, the formatting means being arranged for formatting a multilayer storage medium by recording, on each layer of the multilayer storage medium, a first control zone at a first radial position on the layer and a second control zone at a second radial position on the layer for forming an annular data zone of a selected size between the control zones, and for, in the event that the format size is smaller than a maximum available size on the storage medium, positioning on each of the layers corresponding first and second control zones on substantially equal first and second radial positions for forming radially corresponding annular data zones such that the format size equals the sum of the selected sizes of each of the annular data zones.

According to a second aspect of the invention the object is achieved with a method for formatting a storage medium as described in the opening paragraph, the formatting including, in the event of a multilayer storage medium, recording, on each layer of the multilayer storage medium, a first control zone at a first radial position on the layer and a second control zone at a second radial position on the layer for forming an annular data zone of a selected size between the control zones, and, in the event that the format size is smaller than a maximum available size on the storage medium, positioning on each of the layers corresponding first and second control zones on substantially equal first and second radial positions for forming radially corresponding annular data zones such that the format size equals the sum of the selected sizes of each of the annular data zones.

The effect of the measures is that the format command has been made effective for a multilayer storage medium, for example a dual layer optical disc of a rewritable type. The first and second control zones constitute the boundaries of the annular data zone on each layer. Due to the positioning on equal radial positions of said first and second control zones on different layers of the multilayer storage medium, the annular data zones on different layers spatially coincide in radial direction. In the event that the format size is smaller than a maximum available size on the storage medium this arrangement of annular data zones has the advantage that the need to travel in radial direction for a scanning head is reduced, which improves the speed of recording and reading data when jumping to different layers.

The invention is also based on the following recognition. Traditionally, when formatting a record carrier, the annular data zone is formatted to be a contiguous area, having a lead-out control zone at the end. For example according to MMC-5, as explained above, the formatting and address mapping results in a physically contiguous area of maximum size. The inventors have seen that the known process of formatting a single layer record carrier might be applicable for a multilayer record carrier by recording control zones at inner and outer radial boundaries of each recording layer of the record carrier. However, they have also seen that such arrangement would result in a less suitable arrangement of data zones in the event that the format size is smaller than a maximum available size on the storage medium. By then applying the traditional format process, the first layer would have its maximal size, while the subsequent layer(s) would be smaller than the maximum size to arrive at the required total format size. Positioning the control zones on spatially coinciding radial positions, results in the annular data zones being substantially of equal radial size, and having corresponding radial positions. Hence the scanning head may easily and speedily jump from layer to layer.

The inventors have noted that known multilayer record carriers of the read-only type are manufactured by pressing and molding techniques using a master disc for each layer. When data is processed for creating the master discs the total amounts of data to be stored on the record carrier are known. Hence, for manufacturing reasons, the master discs are usually created by roughly subdividing the total amount of data in equal portions. However, such a process of subdividing a known amount of data is not comparable to formatting a blank record carrier still to be recorded with an unknown amount of data. Common sense would always format such discs to their maximum available data capacity. The inventors have first seen that limiting the total recordable size of data zones, by formatting before all data is available, is advantageous. Subsequently, such limitation is effected according to the invention by locating the control zones as proposed, in particular before the data to be recorded is known.

Finally the inventors have noted that some recording devices suitable for write once dual layer storage media have appeared on the market. However, such recorders are postponing the recording of control zones to after the recording of data. Hence no specific formatting for multilayer record carriers as currently proposed is performed; in particular such devices are not arranged for recording control zones which determine a selected size per layer beforehand. Hence, although the novel formatting process is primarily proposed for storage media of a rewritable type, it might also be applied to multilayer record carriers of a write once type for initially setting the selected size for each layer.

In an embodiment of the device the formatting means are arranged for determining a number of layers of the multilayer storage medium, and for determining the selected size by dividing the format size by the number of layers. This has the advantage that the total amount of space required is indicated by the format parameter for setting the selected size for each layer.

In an embodiment of the device the formatting means are arranged for retrieving a number of blocks from the format command as the size parameter, and for determining the selected size by setting the selected size equal to the number of blocks. This has the advantage that the size parameter is used for setting the size for each layer, while the total format size is determined by the number of layers in combination with the size parameter. Hence the user may set the selected size to be applied to each layer.

Further preferred embodiments of the method and device according to the invention are given in the further claims.

BRIEF DESCRIPTION OF THE DRAWINGS

These and other aspects of the invention will be apparent from and elucidated further with reference to the embodiments described by way of example in the following description and with reference to the accompanying drawings, in which FIG. 1 shows a disc-shaped storage medium, recording device and host system, FIG. 2 shows a Format Unit Command, FIG. 3 shows a Format Unit Parameter List, FIG. 4 shows a Format List Header.

In the Figures, elements which correspond to elements already described have the same reference numerals.

DESCRIPTION OF THE PREFERRED EMBODIMENTS

Figure 5:
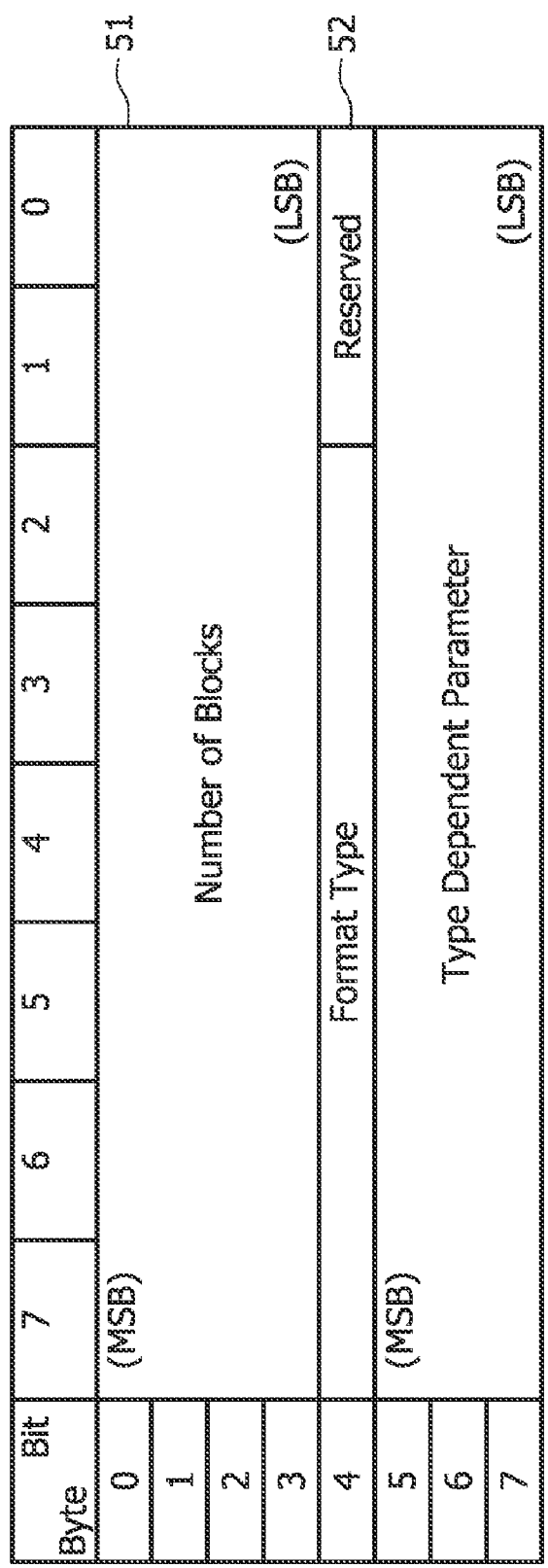
FIG. 5 shows a Format Code Format Descriptor.

FIG. 1 shows a disc-shaped storage medium, recording device and host system. A storage medium 11, for example an optical disc, which has a center hole 10, constitutes a record carrier for cooperating with a recording device 12. Examples of such record carriers are given in MMC-5, in which chapter 4.4 describes a DVD Model (Digital Versatile Disc). The DVD Model is the description for the media types: DVD-ROM, DVDRAM, DVD-R/-RW, and further recordable media types: DVD+R and DVD+RW. Like in the CD system there are multiple types of DVD storage media:
a) Read Only (DVD-ROM)
b) Recordable (i.e., write-once) (DVD-R and DVD+R)
c) Re-Writable (DVD-RAM, DVD-RW, and DVD+RW).
The capacities of these different media vary. Some of these media also have the possibility of one or two sides, and independently, one or two layers per side.

A number of functions of the recording device 12 are defined according to a predefined standard, for example the well-known ATA/ATAPI standard described in MMC-5 (chapter 1) and in particular NCITS T13/1321D AT Attachment with Packet Interface 5 (ATA/ATAPI-5) referenced in MMC-5 (chapter 2.1.2). Hence the device may be called an ATA/ATAPI device. The device 12 has scanning units for scanning the storage medium for recording and reading data, e.g. a read/write head, positioning servo system and control circuits commonly known from the CD or DVD system, acting on the storage medium 11, for example the DVD+RW disc. The device 12 has a host interface 15, e.g. a ATA cable, to communicate with a host system 13, which may be a separate system like a PC. Alternatively the device may be a stand alone device like a video recorder, e.g. having usual elements for input and output of video information. In the video recorder the host system 13 is included, and provides the application side of the interface 15. Hence the medium scanning unit 14, the ATA/ATAPI device 12 combined with the host system 13, may form a Consumer Video Recorder, e.g. for an optical disc like DVD+RW.

The main focus of this invention is on the recording device 12, and the formatting of the storage medium. According to the invention the device has formatting means 16 for formatting the record carrier as described below in detail. In the following the medium and the protocol over the host interface 15 or ATA cable will more deeply be described. It is to be noted that the ATA/ATAPI protocol is only an example, and any interface carrying commands for formatting a storage medium may benefit from the solutions described. There is a problem in the definition of the format commands originally conceived for single layer record carriers, for example as given in MMC-5, and by understanding the relationship between the medium and the protocol, the solution to this problem can be understood.

The ATA cable and its protocol, that are well-known, are described in numerous documents, e.g. the ATA/ATAPI-5 document. The highest protocol level of the cable is given in MMC-5. In the following explanation the storage medium 11 is a DVD+RW medium, which requires for formatting predefined control information to be recorded in specific areas of the record carrier, such as a Control Data Zone in a lead-in area. Obviously only a formatted record carrier can be recognized and handled correctly by recording and/or playback devices. The problem that is addressed in the present invention concerns the FORMAT UNIT command as described in the above MMC-5 in chapter 6.5.

FIG. 2 shows a Format Unit Command. The Figure shows a table of the format command. In a first byte 21 an operation code is given. In a second byte 22 further parameters are given, as explained in chapter 6.5 of MMC-5. For DVD+RW media, the parameter FORMAT CODE "0x001" is applicable. Following the 6 byte command as given in FIG. 2, a data block (format parameter list) is send, representing the parameters of this command.

FIG. 3 shows a Format Unit Parameter List. The Figure shows a table of the format command parameters. In a first set of bytes 31 a Format List header is given, further explained with FIG. 4. In a second set of bytes 32 a Format Descriptor are given, further explained with FIG. 5. The Format Unit Parameter List is further explained in chapter 6.5 of MMC-5.

FIG. 4 shows a Format List Header. The Figure shows a table of the format list header, which is part of the Format Unit Parameter List. In a first byte 41 format options are defined, having a number of flags for specific options. In a second set of bytes 42 a Format Descriptor Length is given, the format Descriptor itself being explained with FIG. 5. The Format List Header is further explained in chapter 6.5 of MMC-5. For DVD+RW there need be no Initialization Pattern Descriptor.

FIG. 5 shows a Format Code Format Descriptor. The Figure shows a table of the format descriptor for Format Code with a value 001b, which is part of the Format Unit Parameter List. Format Descriptors for other format codes are given in MMC-5, e.g. for CD-RW in chapter 6.5.3.4.1.1. In a first set of bytes a size parameter 51 is given, which indicates the format size of the storage medium, i.e. the size of the user data area. In a second byte 52 a Format Type is given. The Format Code 001b Format Descriptor is further explained in chapter 6.5.3.4 of MMC-5.

When a FORMAT command is given, the device may start the actual format process, e.g. by writing a lead-in control zone. Whether this command, and its underlying process, must be completed immediately depends on the value of the IMMED bit shown in FIG. 4. If the IMMED bit is zero, the drive will occupy the ATA bus until the lead-in has been fully formatted.

In general a blank disc must be formatted in order for a DVD-ROM drive to read it. From the existing MMC-5, the format command allows only for a single format size, namely the maximum. According to the invention a solution is provided to allow the format command to allow a large range of different sizes. Note that the solution may use a known format command, like the MMC-5 example described above with reference to FIGS. 2 to 5.

The format command, as shown in FIG. 5, includes a size parameter 51 indicative of a format size. In the recording device 12, the formatting unit 16 performs the following functions for executing the format command. For formatting a multilayer storage medium each layer is recorded as follows. A first control zone is recorded at a first radial position on the layer and a second control zone at a second radial position on the layer. Between both control zones an annular data zone is formed, which has a selected size determined by said radial positions. Note that the first control zone on the first layer is usually called lead-in zone, while the last control zone on the last layer is usually called lead-out zone. Further zones which intermediately end or start layers, may be called middle zones. The total format size is the sum of the sizes of the data zone on each of the individual layers.

The formatting unit 16 determines the available recording capacity of the record carrier. This capacity may be known beforehand, e.g. fixed, depending on a disc type or entered by the user, or may be derived from some physical parameters retrieved from the blank record carrier, e.g. provided with a pregroove that encodes parameters in a wobble pattern or in prepits. Subsequently, the format size that is given by the format command is compared to the available capacity. If the required format size is equal, or a maximum size is required, the formatting is performed by positioning the control zones at the physical boundary of the respective layers, i.e. providing the maximum size for each data zone on each layer.

In the event that the format size is smaller than a maximum available size on the storage medium, the positions of the control zones are determined as follows. First the selected size of the data zone on each layer is determined. Subsequently the selected size is created by positioning, on each of the layers, the first and second control zones that provide the boundaries of the data zone. In particular, the first control zones are positioned on substantially equal first radial positions, and the second zones are positioned on substantially equal second radial positions. Hence radially corresponding annular data zones are formed. The selected sizes are set such that the format size equals the sum of the selected sizes of each of the annular data zones.

In an embodiment for a multilayer storage medium, the medium may have a pattern of tracks that is opposite on adjacent layers, called an opposite track path record carrier. For example a dual layer disc having opposite track path may have, on the first layer called L0, a lead-in zone as a first control zone at a minimum radial position constituting the inner physical boundary of the recordable area. On the second layer called L1, a first control zone called the lead-out zone is recorded on the corresponding radial position at the inner physical boundary, which now terminates the data zone on L1. The selected size, i.e. half of the total format size, is determined, and is used to determine the position of a second control zone on L0, called L0 middle zone. Due to the required selected size being smaller than the maximum size, the L0 middle zone is not at the physical outer boundary of the recording area, but at an intermediate radial position. On L1, at a corresponding second radial position, a further middle zone, the L1 middle zone, is recorded.

Figure 6:
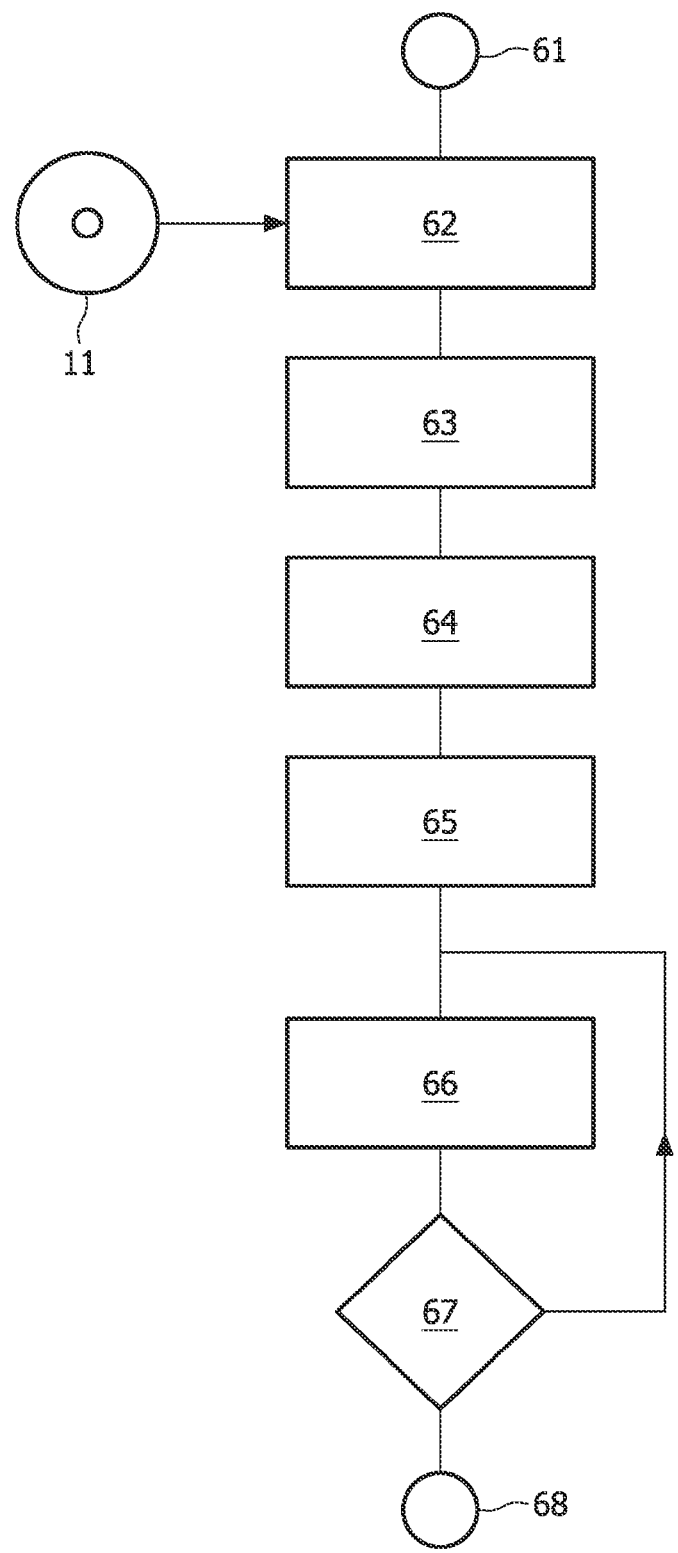
FIG. 6 shows a formatting function of a recording system.

FIG. 6 shows a formatting function of a recording system. The formatting function may be performed in a programmable unit, like a PC or a microprocessor, based on a software program. Alternatively the formatting function may be embedded in a recording device like an optical disc drive. Initially, at START 61, the system is assumed ready for use. In step MOUNT 62 a storage medium 11 is entered, e.g. inserted or activated, and the units for physically accessing the storage medium are activated. In step RECEIVE 63 a command may be received via an interface, e.g. a user interface or an interface to a PC system. It is assumed a format command is received. The format command includes a format size indication, e.g. the indication that the storage medium is to be formatted at 80% of its maximum size, or at a specific size.

Next, in step DETERMINE CAPACITY 64, the available capacity of the record carrier is detected, for example from physical disc parameters retrieved from the record carrier or from an indicator, like a barcode, on the record carrier or on a cartridge. In step CALCULATE 65 the required size of the data zones of each layer is determined based on the format size and the physical data capacity of each layer, and the number of layers. Also the logically required size of the data zone is used to determine the physical positions, in radial direction, of the control zones. As is well known, the actual radial positions may be based on servo information already present on the blank record carrier, such as a pregroove or servo pattern. Next, in a step RECORD 66, the first and second control zones are written on a first layer. In step NEXT LAYER 67, it is decided to return to step RECORD 66 if further layers have to be written. If not, the formatting is completed at point READY 68. It is noted that the order of writing the respective control zones may alternatively be set to first recording the first control zones on each layer, and subsequently recorded the second control zones on each layer. The latter order may in practice be faster than the first, because radially moving a writing head between inner and outer boundaries is relatively slow, while jumping from layer to layer is relatively fast.

In an embodiment the formatting system determines a number of layers NL of the multilayer storage medium which has been entered. Subsequently, for determining the selected size SS, the format size is derived from the received format command, e.g. from the format parameter 51 indicating a format size. The selected size is then calculated by dividing the format size by the number of layers NL. For example the format size may be given as a number of blocks NB. The selected size is then determined by dividing the number of blocks by the number of layers:

$$SS=NB/NL.$$

In an embodiment the formatting system retrieves a number of blocks NB from the format command as the size parameter. The number of blocks NB may directly indicate the required selected size, whereby the total format size equals said number of blocks NB times the number of layers NL of the storage medium to be formatted. Hence the selected size is set equal to the number of blocks NB.

In an embodiment for step RECEIVE 63 is arranged for receiving a dual layer optical disc having a first layer (L0) and a second layer (L1) as the multilayer storage medium. The format command provides the number of blocks NB as the size parameter. Subsequently the step CALCULATE 65 sets the selected size of the first layer (L0size) equal to the number of blocks (NB) divided by two:

$$L0size=NB/2.$$

Hence the Number of Blocks NB implies the selected size for L0, and also for L1 which is equal.

It is noted that a straightforward transfer of existing format functions would result in a format system fixed for just one format size on a rewritable disc, namely the maximum. Allowing different sizes allows a user to take advantage of the flexibility to create discs for different applications. Also, calculating the L0size to be half of the total disc size is a wise way of utilizing parameters of the standard format command, which prevents introducing new and difficult size parameters.

Figure 7:
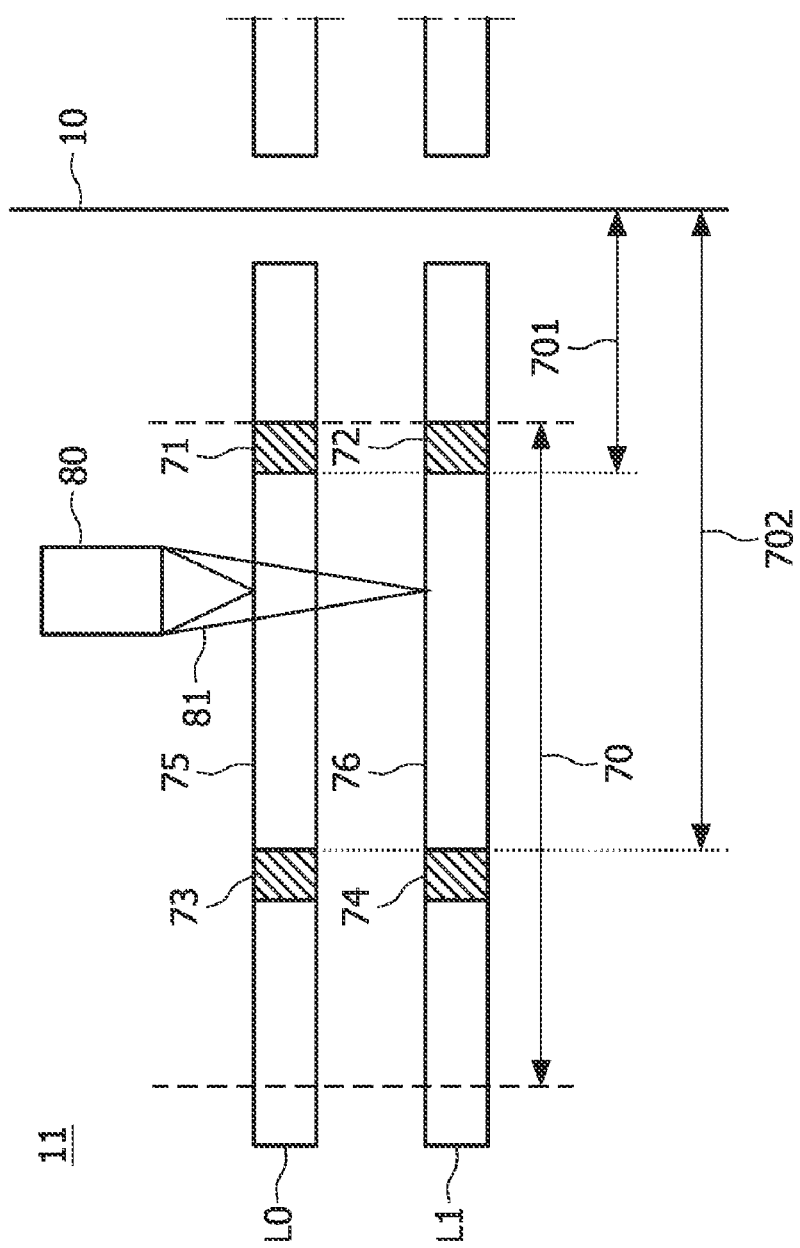
FIG. 7 shows a formatted record carrier.

FIG. 7 shows a formatted record carrier. The Figure schematically shows a record carrier 11, in which the center hole 10 provides a radial orientation for rotating the record carrier in a recording device. A first recording layer L0 and a second recording layer L1 are shown, and are accessible from the same entry side by an optical beam 81 from a scanning head 80 focused on the respective layer. Each layer has a recordable area 70 from the inner physical diameter to an outer physical diameter, which diameters are defined for the respective storage medium type and are to be covered by any recording device. The record carrier has been formatted as discussed above to a total format size lower than the available maximum data capacity. Thereto a first control zone 71, e.g. a lead-in, has been written at the inner boundary of L0 extending up to a minimum radial position as indicated by arrow 701. A further first control zone, e.g. a lead-out, has been written at the inner boundary of L1, at the same minimum radial position. On L0 a second control zone 73, an upper middle zone, has been written extending up to an intermediate radial position as indicated by arrow 702, whereas at a same radial position a further middle zone 74 has been written on L1. For example this may result in a disc formatted at 60% of the maximum data capacity.

Although the invention has been mainly explained by embodiments using DVD+RW dual layer optical discs, the invention is also suitable for other multilayer record carriers such as rectangular optical cards, magneto-optical discs, high-density (Blu-ray) discs or any other type of information storage system that has a recordable layer that is to be formatted in annular zones. In particular the number of layers may also be larger than 2. Corresponding control zones providing start and end boundary may then be positioned on each layer, such that the data zones spatially coincide for the stack of layers.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. A device for recording information on a multilayer optical storage medium, the device comprising:
   scanning means for scanning the multilayer optical storage medium for recording and retrieving data on a recording layer of the multilayer optical storage medium, said medium being in an unformatted state,
   interface means for receiving commands according to a protocol, the commands including a format command, and
   formatting means for formatting the multilayer optical storage medium according to the format command, the format command including a size parameter indicative of a format size,
   the formatting means:
      formatting the multilayer optical storage medium by recording, on each layer of the multilayer storage medium, a first control zone at a first radial position and a second control zone at a second radial position thereby forming an annular data zone between corresponding control zones, said annular data zone having a selected size, and
      positioning on each of the layers corresponding first and second control zones on substantially equal first and second radial positions forming corresponding annular data zones, wherein the radial positions of said first and second control zones are determined based on said selected size of a corresponding annular data zone, wherein the first control zones of each of the layers is written prior to writing said second control zones and the format size equals a sum of the sizes of each of the annular data zones.

2. The device as claimed in claim 1, wherein the formatting means are arranged for determining a number of layers (NL) of the multilayer storage medium, and for determining the selected size by dividing the size parameter by the number of layers (NL).

3. The device as claimed in claim 1, wherein the formatting means are arranged for retrieving a number of blocks (NB) from the format command as the size parameter, for determining the selected size by setting the selected size equal to the number of blocks (NB).

4. The device as claimed in claim 2, wherein the formatting means are arranged for receiving a dual layer optical disc having a first layer (L0) and a second layer (L1) as the multilayer storage medium, for retrieving a number of blocks (NB) from the format command as the size parameter, and for setting the size of the annular data zone of the first layer (L0size) equal to the number of blocks (NB) divided by two:

$$L0size=NB/2.$$

5. The device as claimed in claim 1, wherein the scanning means are arranged for recording data on a multilayer optical record carrier of a rewritable type.

6. The device as claimed in claim 1, wherein the device comprises a host system, and the interface means are arranged for receiving the commands from the host system.

7. The device as claimed in claim 6, wherein the device is a video recorder device and the host system comprises video processing means.

8. A method of formatting an unformatted multilayer optical storage medium for recording data and retrieving data, the method comprising:
receiving commands according to a protocol, the commands including a format command, and
formatting the storage medium according to the format command, the format command including a size parameter indicative of a format size,
the formatting comprising:
recording, on each layer of the multilayer storage medium, a first control zone at a first radial position and a second control zone at a second radial position thereby forming an annular data zone of a selected size between the first and second control zones,
positioning on each of the layers corresponding first and second control zones on substantially equal first and second radial positions for forming corresponding annular data zones of said selected size, wherein the first control zones of each of the layers is written prior writing said second control zones and the format size equals a sum of the sizes of each of the annular data zones.

9. A computer program product stored on a non-transitory tangible medium for formatting an unformatted multilayer optical storage medium for recording data thereon and retrieving data therefrom, said program being operative to cause a processor to perform the steps of:
receiving commands according to a protocol, the commands including a format command, and
formatting the storage medium according to the format command, the format command including a size parameter indicative of a format size,
the formatting including, in the event of a multilayer storage medium,
recording, on each layer of the multilayer storage medium, a first control zone at a first radial position on the layer and a second control zone at a second radial position thereby forming an annular data zone of a selected size between the control zones, and,
positioning on each of the layers corresponding first and second control zones on substantially equal first and second radial positions, wherein the first control zones of each of the layers is written prior to writing said second control zones and the format size equals a sum of the sizes of each of the annular data zones.

* * * * *